United States Patent
Bhandaru et al.

(10) Patent No.: US 9,436,245 B2
(45) Date of Patent: Sep. 6, 2016

(54) DYNAMICALLY COMPUTING AN ELECTRICAL DESIGN POINT (EDP) FOR A MULTICORE PROCESSOR

(75) Inventors: Malini K. Bhandaru, Sudbury, MA (US); Eric J. Dehaemer, Shrewsbury, MA (US); Jeremy J. Shrall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 13/997,757

(22) PCT Filed: Mar. 13, 2012

(86) PCT No.: PCT/US2012/028876
§ 371 (c)(1),
(2), (4) Date: Jun. 25, 2013

(87) PCT Pub. No.: WO2013/137860
PCT Pub. Date: Sep. 19, 2013

(65) Prior Publication Data
US 2014/0195829 A1   Jul. 10, 2014

(51) Int. Cl.
*G06F 1/26* (2006.01)
*G06F 1/32* (2006.01)

(52) U.S. Cl.
CPC .............. *G06F 1/26* (2013.01); *G06F 1/324* (2013.01); *G06F 1/3206* (2013.01); *G06F 1/3296* (2013.01); *Y02B 60/1217* (2013.01); *Y02B 60/1285* (2013.01)

(58) Field of Classification Search
CPC ........ G06F 1/26; G06F 1/3296; G06F 1/324; G06F 1/3206; Y02B 60/1285; Y02B 60/1217
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |

(Continued)

FOREIGN PATENT DOCUMENTS

EP   1 282 030 A1   5/2003

OTHER PUBLICATIONS

Microsoft® Computer Dictionary by: Microsoft Press Publisher: Microsoft Press Pub. Date: Mar. 15, 2002 Print ISBN-13:978-0-7356-1495-6 Print ISBN-10: 0-7356-1495-4 Pages in Print Edition: 656.*

(Continued)

*Primary Examiner* — Jaweed A Abbaszadeh
*Assistant Examiner* — Brian J Corcoran
(74) *Attorney, Agent, or Firm* — Trop, Pruner & Hu, P.C.

(57) ABSTRACT

In one embodiment, a multicore processor includes a controller to dynamically limit a maximum permitted turbo mode frequency of its cores based on a core activity pattern of the cores and power consumption information of a unit power table. In one embodiment, the core activity pattern can indicate, for each core, an activity level and a logic unit state of the corresponding core. Further, the unit power table can be dynamically computed based on a temperature of the processor. Other embodiments are described and claimed.

16 Claims, 9 Drawing Sheets

(56) References Cited

U.S. PATENT DOCUMENTS

| | | |
|---|---|---|
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,611 B2 | 8/2008 | Tipley |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,596,705 B2 | 9/2009 | Kim |
| 7,730,340 B2 | 6/2010 | Hu et al. |
| 8,429,441 B2 | 4/2013 | Baker et al. |
| 8,438,359 B2 | 5/2013 | Kasahara et al. |
| 8,463,973 B2 | 6/2013 | Naffziger et al. |
| 8,560,869 B2 | 10/2013 | Allarey |
| 8,924,758 B2* | 12/2014 | Steinman et al. ............ 713/320 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0025069 A1 | 2/2004 | Gary et al. |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0033425 A1 | 2/2007 | Clark |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0005592 A1 | 1/2008 | Allarey et al. |
| 2008/0028240 A1 | 1/2008 | Arai et al. |
| 2008/0162972 A1 | 7/2008 | Liu et al. |
| 2008/0250260 A1 | 10/2008 | Tomita |
| 2009/0006871 A1 | 1/2009 | Liu et al. |
| 2009/0132844 A1* | 5/2009 | Allarey et al. ............ 713/340 |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1* | 7/2009 | Rotem et al. ............ 713/1 |
| 2009/0172428 A1 | 7/2009 | Lee |
| 2009/0187776 A1* | 7/2009 | Baba .............. G06F 1/3203 713/320 |
| 2009/0235105 A1 | 9/2009 | Branover et al. |
| 2010/0064162 A1 | 3/2010 | Rotem et al. |
| 2010/0115304 A1 | 5/2010 | Finkelstein et al. |
| 2010/0115309 A1 | 5/2010 | Carvalho et al. |
| 2010/0138675 A1 | 6/2010 | Nikazm et al. |
| 2010/0146513 A1 | 6/2010 | Song |
| 2010/0191997 A1 | 7/2010 | Dodeja et al. |
| 2010/0213919 A1* | 8/2010 | Takayanagi et al. ......... 323/318 |
| 2011/0138388 A1 | 6/2011 | Wells et al. |
| 2011/0154090 A1 | 6/2011 | Dixon et al. |
| 2011/0161683 A1 | 6/2011 | Zou et al. |
| 2011/0258477 A1 | 10/2011 | Baker et al. |
| 2012/0054515 A1 | 3/2012 | Naffziger et al. |
| 2012/0072750 A1 | 3/2012 | Jahagirdar et al. |
| 2012/0079290 A1 | 3/2012 | Kumar et al. |
| 2012/0246506 A1 | 9/2012 | Knight |
| 2012/0331321 A1* | 12/2012 | Kaburlasos ............ G06F 1/3228 713/323 |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0068284 A1 | 3/2014 | Bhandaru et al. |
| 2014/0068290 A1 | 3/2014 | Bhandaru et al. |
| 2014/0195829 A1 | 7/2014 | Bhandaru et al. |
| 2014/0208141 A1 | 7/2014 | Bhandaru et al. |

OTHER PUBLICATIONS

U.S. Patent and Trademark Office, Office Action mailed Aug. 5, 2014 in U.S. Appl. No. 13/600,568, with Reply to Office Action filed on Oct. 29, 2014.

International Searching Authority, "Notification of Transmittal of the International Search Report and the Written Opinion of the International Searching Authority," mailed Nov. 28, 2012, in International application No. PCT/US2012/028876.

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

U.S. Patent and Trademark Office, Office Action mailed on Jul. 17, 2015 and Reply filed Oct. 13, 2015 in U.S. Appl. No. 13/997,288.

U.S. Patent and Trademark Office, Office Action mailed Jun. 10, 2015 and Reply filed Sep. 10, 2015, in U.S. Appl. No. 13/997,386.

U.S. Patent and Trademark Office, Office Action mailed Jul. 17, 2015, in U.S. Appl. No. 13/997,288.

* cited by examiner

DYNAMICALLY COMPUTING AN ELECTRICAL DESIGN POINT (EDP) FOR A MULTICORE PROCESSOR

TECHNICAL FIELD

Embodiments relate to power management of an integrated circuit.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, demanding software, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

In addition, there are various constraints placed on an integrated circuit with regard to the level at which it can operate, both as to operating frequency and voltage (as well as other possible constraints). Many of these constraints are placed by the manufacturer of an integrated circuit and can relate to parameters such as a thermal design point (TDP), which is a maximum heat dissipation that an associated cooling system can handle for the integrated circuit (and thus the average maximum power that the integrated circuit can consume). The integrated circuit can similarly be constrained to operate at a maximum available frequency, maximum available voltage and so forth.

Depending on the environmental conditions at which an integrated processor is operating and its processing load, a processor may be constrained to operate at no greater than an electrical design point (EDP) which is a maximum power consumption level (actually current, translated to power) that the integrated processor as a whole is not allowed to exceed, even instantaneously. While this EDP is set on manufacture for different operating conditions (e.g., temperature and so forth), as greater amounts of cores and other circuitry are present on a processor or other integrated circuit, which can potentially operate at different power consumption levels, it becomes difficult to monitor and determine a dynamic EDP for the processor.

DETAILED DESCRIPTION

Figure 1:
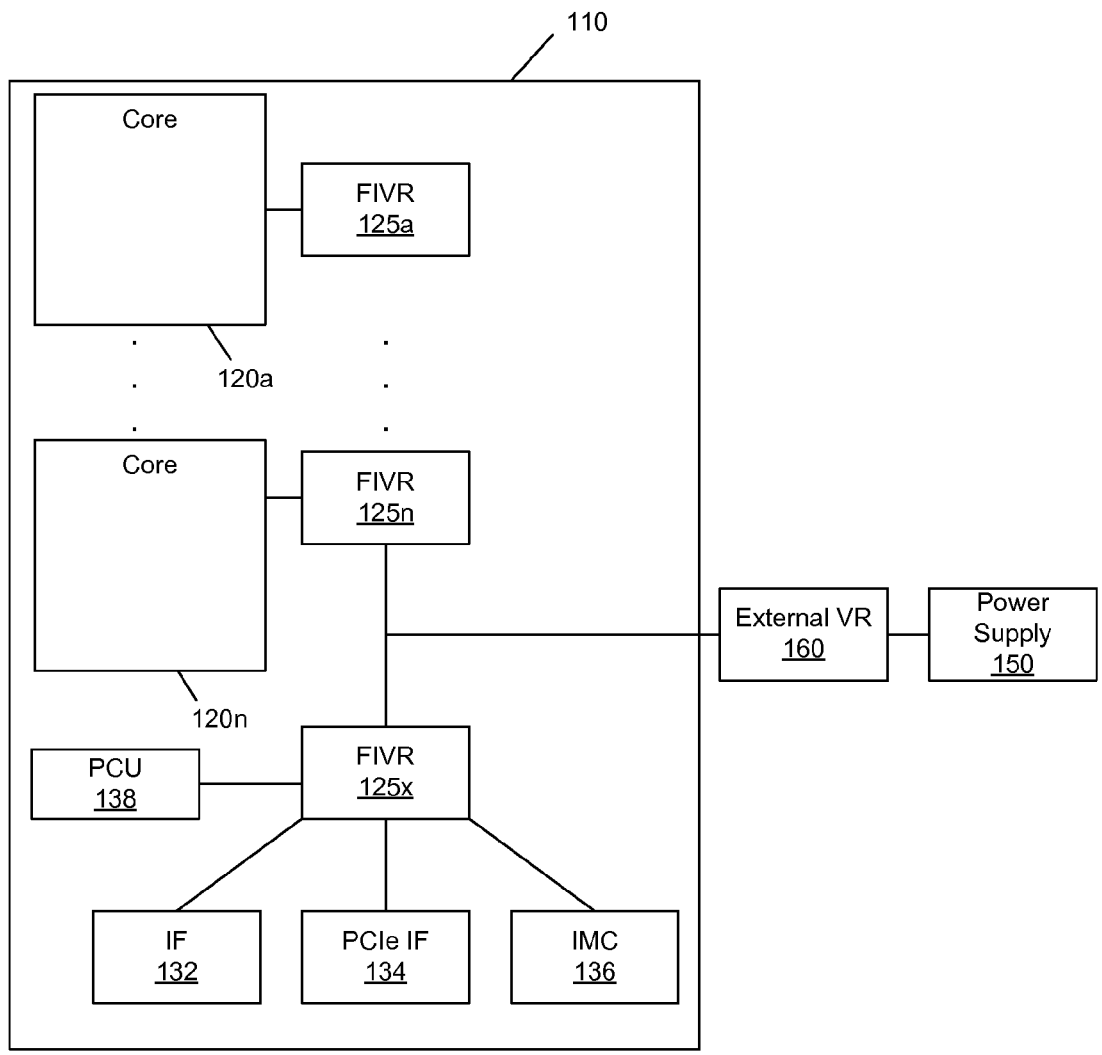
FIG. 1 is a block diagram of a portion of a system in accordance with an embodiment of the present invention.

Embodiments may determine an electrical design point (EDP) constraint for a multicore processor in which each core (or group of cores) can be at a separate frequency point. In addition to frequency independency, the cores can be independently active or in a sleep state, and if active, may or may not be using certain high power consuming circuitry such as special multiply-add or vector processing circuitry. Each of these aspects affects the amount of power consumed by a core. The total power consumed by all cores may be controlled to fit within a given power budget and electrical design point.

Optimizing a system for maximum performance at minimum power consumption is usually done using the operating system (OS) or system software to control hardware elements. Most modern OS's use the Advanced Configuration and Power Interface (ACPI) standard (e.g., Rev. 3.0b, published Oct. 10, 2006) for optimizing the system in these areas.

According to an OS-based ACPI mechanism, a processor can operate at various power and performance states or levels. With regard to power states, ACPI specifies different sleep states, generally referred to as C0 to Cn states. When a core is active, it runs at a C0 state, and when the core is idle it may be placed in a core low power state, also called a core non-zero C-state (e.g., C1-C6 states). When all cores of a multicore processor are in a core low power state, the processor can be placed in a package low power state, such as a package C6 low power state.

In addition to these sleep states, a processor can further be configured to operate at one of multiple performance states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies, also referred to herein as turbo mode frequencies, above this P1 frequency. The highest such frequency may correspond to a maximum available turbo mode frequency (P01), which is a highest frequency at which a domain can operate. This maximum available turbo mode frequency thus is the highest end of multiple turbo mode frequencies greater than the P1 frequency and corresponds to a maximum non-guaranteed highest performance level that can be achieved. Note that the terms "performance state" or "P-state" can be interchangeably used with the term "operating frequency" (or more generally "frequency") as the frequency at which a core operates has a direct correlation to its performance. Thus as used herein a higher performance state correlates to a higher operating frequency.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_a$-$125_n$. Accordingly, a fully implemented voltage regulator (FIVR) implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, an integrated memory controller 136, and a power control unit (PCU) 138. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

In various embodiments, PCU 138 may include logic to perform an efficient analysis to determine a maximum permitted turbo mode frequency, also referred to herein as an EDP clip point. While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Conventional multicore processors operate all cores at a single common frequency, which reduces EDP calculation complexity. In such a processor, a table, indexable by the number of active/sleeping cores and number of cores using math units, is used to determine the maximum operating frequency that meets the electrical design point. The table is recomputed each time the temperature changes by a significant amount. However, in various embodiments such a table becomes prohibitively large given that each of the cores can in addition seek and operate at a different frequency from its siblings. And the dynamic frequency range for core operation increases as core counts increase. Large tables require more time for computation, with recomputations performed on any significant temperature change. Further, storage space increases with table size, increasing die size and power dissipation. A possible optimization is to trim table size by bucketing frequencies, but in so doing approximations would result in greater than necessary EDP clipping that would compromise performance. A combination of a partially generated but accurate table with a search in a smaller subspace is a more complex solution without adequate savings in space and compute time. In fact, on a simple processor used for firmware execution, determining the upper and lower power envelopes for a core activity pattern (frequencies, active/sleep, math on/off) is itself non-trivial and may require nearly as many compute cycles as computing full power for that pattern.

Embodiments thus provide a dynamic clip point computation algorithm to determine EDP in the context of per core P-states (PCPS), to enable the operation of cores at different voltage/frequencies. To this end, a unit power table may be computed and maintained. Then based on this table and information regarding a core activity pattern, an EDP clip point can be determined.

Figure 2:
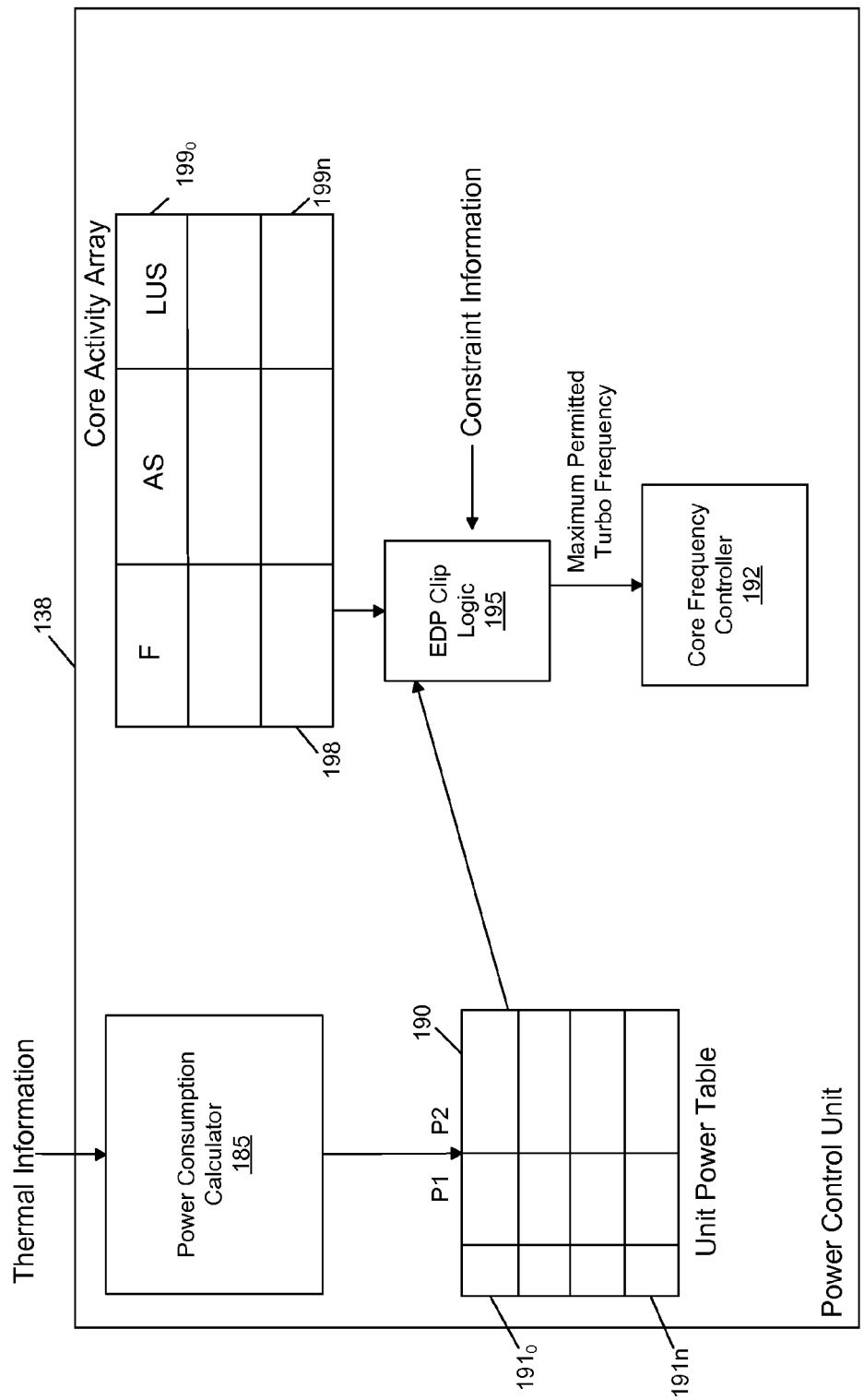
FIG. 2 is a block diagram of a power control unit in accordance with an embodiment of the present invention.

The various computations performed in an embodiment may be performed within a power control unit of the processor. Referring now to FIG. 2, shown is a block diagram of a power control unit 138 in accordance with an embodiment of the present invention. As shown in FIG. 2, PCU 138 can include various calculation engines, logic, tables, arrays, controllers and so forth. Although shown with certain components in this embodiment, understand that additional circuitry and other logic also may be present. As seen, a unit power table 190 can be populated based on information calculated in a power consumption calculator 185. In various embodiments, calculator 185 may receive thermal information such as temperature information from one or more cores to thus indicate an overall temperature of the processor. Based on this thermal information, power consumption calculator 185 can determine power consumption levels for given frequencies of operation, depending on the types of core circuitry active.

Accordingly as shown in FIG. 2, unit power table 190 may include a plurality of entries $191_0$-$191_n$. In one embodiment, unit power table 190 may include N entries or rows, and can be of dimension (N×2). Each entry may be associated with a discrete quantized frequency at which a core may operate. Without loss of generality, in some embodiments every quantization level need not be represented in the table if ranges are handled as a pre-index step to group elements together as close in power. Each such entry may be associated with an operating frequency. In one embodiment, only operating frequencies above a guaranteed minimum frequency, namely frequencies ranging from this guaranteed minimum operating frequency up to a maximum available turbo frequency, may have corresponding entries. Each such entry may include multiple fields, including a first power field (P1) and a second power field (P2). As described further, these fields may store a power consumption calculation made by calculator 185 for the corresponding processor temperature at the associated frequency.

Note that unit power table 190 may be recomputed on any significant temperature change (e.g., approximately 1-2 Celsius), given that capacitance changes with temperature and hence the power to operate at any given frequency changes. In one embodiment, the power may be computed according to $tV^2f$, where t=temperature, V=voltage and f=frequency.

Thus as seen in FIG. 2, each entry 191 (corresponding to a frequency bin) may include two fields, each indicating a power consumption level at which the core is to operate. A first power field (P1) may be for a power consumption level of the core for the indicated frequency without certain high power consumption circuitry executing (which in one embodiment can be circuitry for extended mathematical capabilities (approximating vector and fused multiply/add (FMA) units as equivalent). And a second power field (P2) may be for a power consumption level of the core for the indicated frequency with certain high power consumption circuitry executing. In other embodiments, a larger number of fields can be used to more finely determine power consumption. For example in one embodiment the vector and FMA units can be segmented and a table having three power consumption fields may be used, as these two units are not used simultaneously.

Still referring to FIG. 2, PCU 138 further includes a turbo mode clip logic, also referred to as EDP clip logic 195, which may be used to perform analysis of available power and to limit or clip a turbo mode frequency at a level lower than the maximum available turbo mode frequency. In addition to information from unit power table 190, EDP clip logic 195 may further receive processor constraint information which will be discussed further below. In addition, clip logic 195 may further receive information from a core activity array 198. In various embodiments, array 198 may include a plurality of entries 199₀-199ₙ. Each such entry can be associated with a given core and can include various fields, including an operating frequency field, an activity field, and a logic unit field. In general, the activity field can indicate whether the corresponding core is in an active or low power state, and the logic unit field can indicate whether certain circuitry of the core such as high power processing circuitry (e.g., vector or advanced math units) is active.

In various embodiments, to determine the activity level of a core, activity array 198 may be maintained, e.g., in a storage of PCU 138. This array, also referred to as a core activity pattern storage, may include N elements, one per core of the multicore processor. In one embodiment, each element is a triplet that abstracts core activity as follows: <frequency, active/inactive, math-unit active/inactive>.

As examples, two such entries of this array may be as follows:
<F1, active, math-unit inactive>
<F2, sleep, math-unit active>.

Note that although described with these particular parameters in this embodiment, more or different parameters may be considered. In one embodiment, this array can be populated using activity information received from the cores, e.g., via a PCU interrupt that provides information about any thread, and thus core, C-state, and/or P-state change request. Also understand that in other embodiments, one or both of unit power table 190 and core activity array 198 may be located outside of the PCU.

Based on all of this information, clip logic 195 can determine a maximum permitted turbo frequency, which can be lower than the maximum available turbo mode frequency, e.g., as fused into the part. Based on the analysis performed in clip logic 195, this maximum permitted turbo frequency can be provided to a core frequency controller 192 which may be used to communicate an authorized operating frequency to each of the cores within the processor. Although shown at this high level in the embodiment of FIG. 2, understand the scope of the present invention is not limited in this regard.

In one embodiment, a search for the EDP constraint may be implemented in EDP clip logic 195, which can include firmware of the PCU. To not violate the electrical design constraint in the core power domain, the power drawn by each core is estimated and the sum is calculated. Then it can be determined whether this estimated power sum would exceed the power budget at the maximum current that may be drawn. If the sum exceeds power limits, the maximum frequency of operation can be dropped progressively until the sum satisfies the power constraint. Progressively dropping operating frequency may be more productive and fairer than turning off cores.

Embodiments may use a binary search with certain heuristics to determine the EDP clip point. In an exemplary embodiment, the maximum number of iterations is log(N), where N is the number of rows in the unit power table. In one embodiment the heuristics may include: 1) first considering all other constraints, such as thermal, stock keeping unit (SKU) and so forth such as customer-specified such as over clocking or a lower than maximum turbo to clip the upper limit, effectively reducing the range, and hence search space speeding the search; and 2) to further speed the search, classify the cores into three groups: inactive, guaranteed, and turbo. Of course other groupings are possible, such as multiple guaranteed groupings, depending on whether certain circuitry is active or inactive.

Then to determine the available amounts of power for cores in or seeking a turbo mode, power for the cores seeking a frequency at or below the maximum guaranteed frequency is first computed. This total power consumption for guaranteed cores can be subtracted from the total power budget along with power for additional circuitry of the processor, such as an uncore circuit, effectively reducing the number of operations per iteration, because there may be fewer than K turbo cores, where K is the number of cores in the system.

In one embodiment, the search may terminate in certain circumstances. First, a search can be terminated upon encountering an iteration where no clipping occurs. Such iteration occurs when all the cores seek a frequency lower than the EDP clip point under investigation. Second, a search can be terminated when the residual power at a potential EDP clip point is lower than a configured threshold. In one embodiment, this threshold may be the power to run a single core at the lowest possible frequency.

Embodiments thus support EDP in a context in which individual or clusters of cores operate at different voltage/ frequency (V/F) points. Supporting EDP in such contexts is handled by a compute-on-the-fly approach in accordance with an embodiment of the present invention to avoid the prohibitive size and compute time to facilitate table lookup based solutions.

Figure 3:
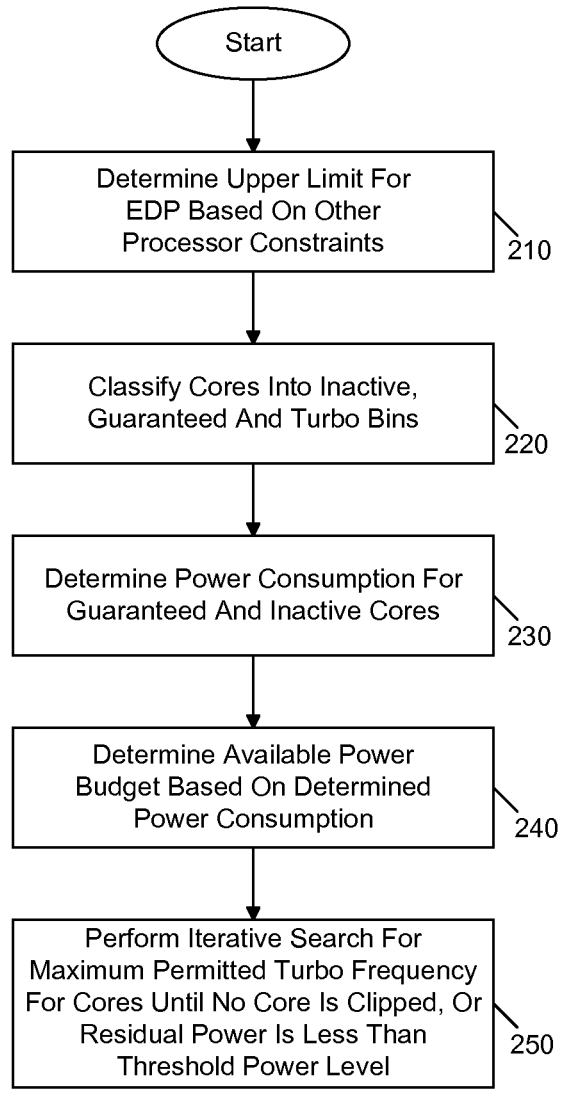
FIG. 3 is a flow diagram of a method for performing an electrical design point (EDP)-based turbo frequency clip analysis in accordance with an embodiment of the present invention.

Referring now to FIG. 3, shown is a flow diagram of a method for performing an EDP-based turbo mode clip analysis in accordance with an embodiment of the present invention. As shown in FIG. 3, method 200 may be implemented by logic such as EDP clip logic of a PCU. In the embodiment of FIG. 3, method 200 can begin by determining an upper limit for EDP based on other processor constraints (block 210). As described above, in addition to EDP, a processor may have other constraints placed on its power consumption based on, e.g., thermal constraints and SKU constraints, among others. These constraints thus act to place an upper limit on the EDP.

Next, control passes to block 220 where the cores can be classified into different bins. In the embodiment of FIG. 3 these bins can include: an inactive bin when a given core is in a non-C0 state; a guaranteed bin, which corresponds to cores that are operating at a guaranteed performance level or lower (e.g., a P1 or lower performance level); and a turbo bin, which corresponds to cores that are in or are seeking to enter into a turbo mode, namely an opportunistic performance mode higher than the guaranteed P1 performance mode. Note that a given processor can have multiple bins or levels of upside performance greater than the guaranteed performance level up to a maximum available turbo level, also referred to herein as a P01 performance level.

After classifying the cores, control passes to block 230 where power consumption can be determined for the guaranteed and inactive cores. In many implementations, the power consumption contribution of an inactive core may be close to or equal to zero Watts. In one embodiment, the determination of power consumed by the cores can be based on information in a unit power table to provide information as to power consumption for a given performance level and type of circuitry active. Via a PCU, embodiments may have access to thread/core active status, and circuitry in action, in particular PCU system state information/storage that is updated by transition events. In one embodiment, such information may be held in mask for rapid use, for example, core sleep state masks for each of sleep states C0, C3, and C6. Next, this determined power consumption for the guaranteed cores can be subtracted from the available power budget to thus determine an available power budget at block 240.

Control then passes to block 250 where based on this available power budget, an iterative search can be performed. More specifically this search may determine the maximum permitted turbo mode for the cores. In one embodiment, a binary search may be performed iteratively until an iteration of the search occurs in which no core is clipped, meaning that no core is requesting a turbo level higher than an EDP clip point, which may be set at a given turbo level. Or, the iterations can conclude when the residual power is less than a threshold power level. In one embodiment, this threshold power level may correspond to the lowest amount of power able to power a core at its minimum operating frequency. Although shown at this high level in the embodiment of FIG. 3, understand the scope of the present invention is not limited in this regard.

Referring now to Table 1, shown is example pseudocode for performing a dynamic EDP binary search/clip point analysis in accordance with an embodiment of the present invention.

TABLE 1

If (no turbo cores) return max-guaranteed ratio.

```
if (min_constraint < MAX_GUARANTEED_RATIO) {
    return min_constaint; // Can happen if there are thermal constraints,
an overheated chasis
} else {
    FOREACH_BIT(coreIndex, guaranteed_cores_mask) {
        int core_pstate = corePStateRequest[coreIndex];
        bool math_active = mathActive[coreIndex];
        guaranteed_power += unit_power_table[core_pstate,
        math_active] ;
    }
    int avail_power = power_budget - guaranteed_power;
    assert (avail_power > 0) ;
// binary search with heuristics
    int low = MAX_GUARANTEED_RATIO;
    int high = MAX_TURBO (aka P01)
    int mid;
    int power_crumb =
    unit_power_table[MAX_GUARANTEED_RATIO, false];
    bool found = false;
    bool clipped = false;
    double remaining_power = 0;
    while (!found) {
        mid = (high + low)/2;
        clipped = false;
        rem_power = avail_power;
        FOREACH_BIT(coreIndex, turbo_cores_mask) {
            int core_pstate = corePStateRequest[coreIndex];
            bool math_active = mathActive[coreIndex];
            if (core_pstate > mid) {
                core_pstate = mid;
                clipped = true;
            }
            remaining_power = remaining_power -
            unit_power_table[core_pstate, math_active] ;
        }
        If ( ((remaining_power > 0) && (rem_power <
        power_crumb)) ||
            !clipped) {
            found = true;
        } else if (remaining_power < 0) { // need to push down
        edp_clip point
            high = mid;
        } else if (remaining_power > power_crumb) { // room to
        increase edp_clip point
            low = mid;
        }
        if (!found && ( (high - low) == 1 )) { // EDP clip point is
        one of two alternatives
        // if with (high remaining_power > 0), clip is high else low.
            mid = low;
            found = true;
            if (remaining_power > 0) {
                double remaining_power_high= avail_power;
                FOREACH_BIT(coreIndex, turbo_cores_mask) {
                    int core_pstate = corePStateRequest[coreIndex];
                    bool math_active = mathActive[coreIndex];
                    if (core_pstate > high) {
                        core_pstate = high;
                    }
                    remaining_power_high = remaining_power -
                    unit_power_table[core_pstate, math_active] ;
                }
                if (remaining_power_high > 0) {
                    mid = high;
                }
            } // if (remaining_power > 0)
        } // if (high - low) == 1
    } // if !found
} // while loop
return mid;
} // else
```

Figure 4:
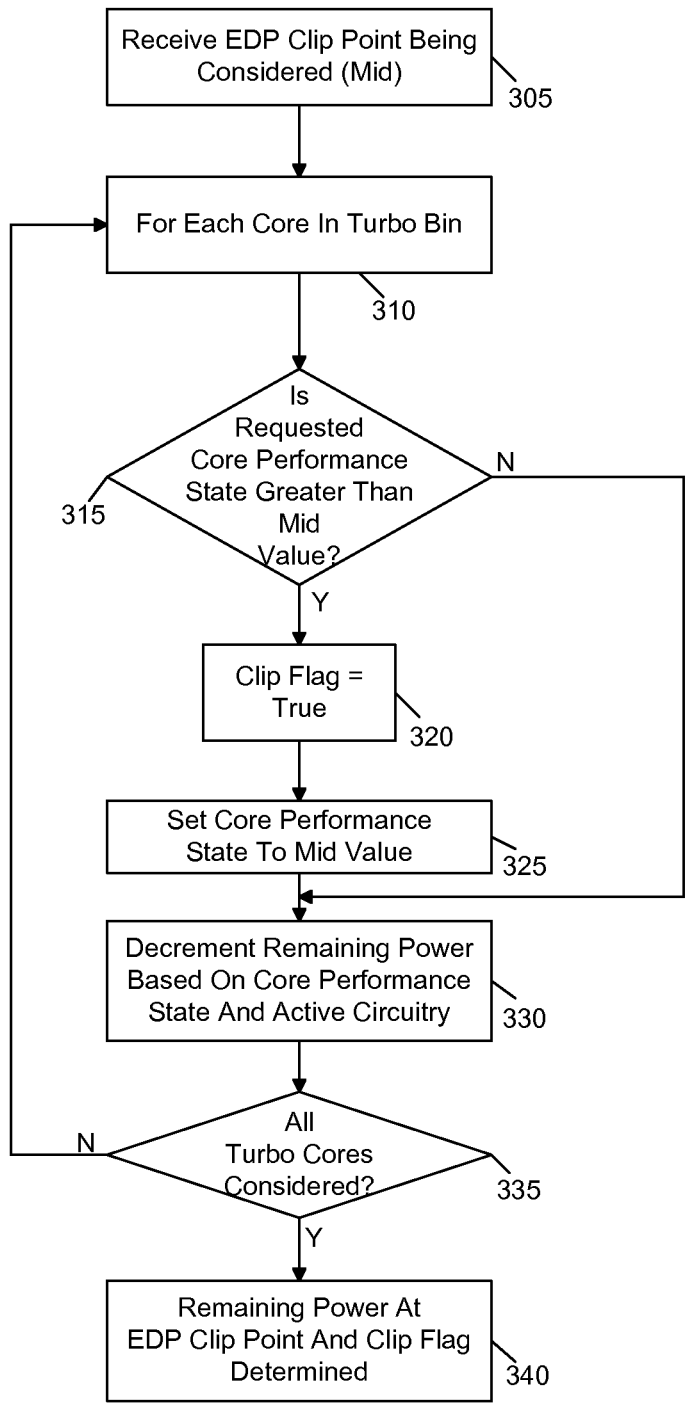
FIGS. 4 and 5 are flow diagrams of a method of determining an EDP clip point according to a binary search in accordance with an embodiment of the present invention.
Figure 5:
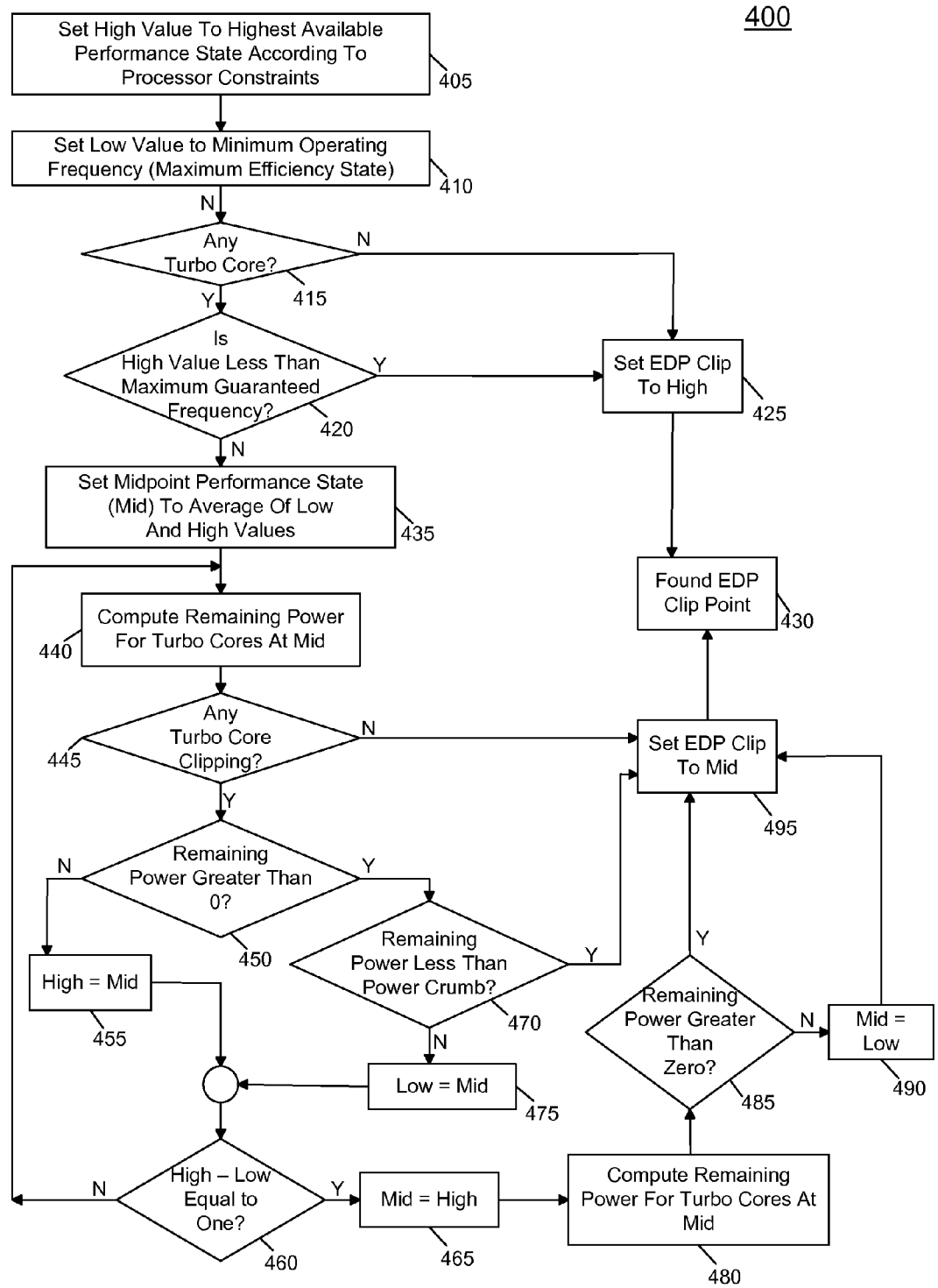

Referring now to FIGS. 4 and 5, shown are flow diagrams of a method of determining an EDP clip point according to a binary search in accordance with an embodiment of the present invention. In general, the flow diagrams of FIGS. 4 and 5 can be used to implement the pseudocode of Table 1.

In general, FIG. 4 shows operations in determining a power consumption level of a processor at a given EDP clip point being considered, taking into account any power budget overheads such as for cores not seeking a turbo mode of operation as well as other processor circuitry such as uncore circuitry.

As seen in FIG. 4, method 300 can be implemented to thus determine the remaining power assuming that any cores seeking turbo are to operate a given EDP clip point and whether at that clip point, one or more of these cores were clipped from a requested performance state to the clip performance state. As seen, method 300 can begin by receiving an EDP clip point being considered (block 305). This clip point may correspond to a midpoint performance state value between a high value and a low value (and is referred to herein as "mid"). Next a loop occurs for each core in a turbo bin (block 310). First it is determined whether the core is requesting a performance state greater than this mid value (diamond 315). If so, control passes to block 320 where a clip flag can be set to a true value. Furthermore, this core can have its performance state clipped, more specifically to this mid value (block 325).

From both block 325 and diamond 315 (if the core is not seeking a higher value performance state than this mid value), control passes to block 330 where the remaining power can be decremented based on this core performance state and whatever circuitry is active in the core. As discussed above, this determination can be based on information in a unit power table, along with this mid value. Next it can be determined at diamond 335 whether all turbo cores have been considered. If not, control passes back to block 310 above. Otherwise, method 300 may conclude at block 340 where the remaining power at this EDP clip point under consideration is thus determined along with the determination of whether the clip flag is indicated to be true (meaning that one or more cores were clipped from a requested performance state to the mid state) or false in that no such core was clipped. Although shown at this high level in the embodiment of FIG. 4, understand the scope of the present invention is not limited this regard.

Referring now to FIG. 5, shown is a flow diagram of further details of a method for performing a binary search for an appropriate EDP clip point in accordance with an embodiment of the present invention. As shown in FIG. 5, method 400 can be implemented to both initialize the binary search, as well as determine whether the search is in fact needed. Finally, based on the analysis of the remaining power described above with regard to FIG. 4, it can be determined whether the appropriate EDP clip point has been found and if so to set the clip point accordingly.

As seen, method 400 can begin by setting a high value to a highest available performance state according to processor constraints (block 405). As discussed above, such constraints can include thermal and SKU among others. In one embodiment, this high value may correspond to the highest possible P-state available. Next control passes to block 410 where a low value can be set to a minimum operating frequency, which also corresponds to a maximum efficiency state. In an embodiment, the low value can correspond to the lowest possible P-state.

Next control passes to diamond 415 where can be determined whether any core is seeking to operate at a turbo mode. If not, control passes to block 425 where the EDP clip point value can be set to this high value. Accordingly, control passes to block 430 where the method may conclude by indicating that the EDP clip point has been found.

If instead of one or more cores is seeking a turbo mode, control passes to diamond 420 where it can be determined whether the high value is less than a maximum guaranteed frequency. If so, control passes to block 425, discussed above. Otherwise, control passes to block 435 where the mid value can be set to the average of the high and low values. Next, control passes to block 440 where a remaining power can be computed for the turbo cores at this mid value. In an embodiment, this computation can be performed according to the method of FIG. 4, discussed above.

Referring still to FIG. 5, control next passes to diamond 445, where it can be determined whether any core has been clipped. This can be determined in accordance with the clip flag discussed above as to FIG. 4. If not, control passes to block 495, where the EDP clip can be sent to the mid value, and accordingly method 400 can conclude at block 430.

Otherwise if at least one of the cores seeking a turbo mode was clipped, control passes to block 450 to determine whether the remaining power is greater than zero. If not, the high value can be set to the mid value at block 455, and next a determination can be made at diamond 460 as to whether a difference between the high and low values is equal to one. If not, control passes to block 440 discussed above.

If instead the difference is equal to one, control passes to block 465 where the mid value can be set equal to the high value, and control passes to block 480 where the remaining power can be computed for the turbo cores using this mid value. This determination may be performed in a similar manner to the calculation described above as to FIG. 4. Control next passes to diamond 485 where it can be determined whether the remaining power is greater than zero. If so, the EDP clip point can be set to this mid value at block 495. Otherwise, control passes to block 490 where the mid value is set equal to the low value. Accordingly control passes to block 495.

Referring still to FIG. 5, if it is determined at diamond 450 that the remaining power is greater than zero, control passes to diamond 470 where it can be determined whether this remaining powers less than a power crumb, which in an embodiment can be set to a minimum power level, namely that sufficient to operate a single core at a lowest performance level. If the answer is yes, control passes to block 495 for setting the EDP clip point to the mid value. Otherwise, control passes to block 475 where the low value can be set equal the mid value, and then control passes to diamond 460 discussed above. Although shown at this high level in the embodiment of FIG. 5, understand the scope of the present invention is not limited in this regard.

Computing EDP clip on the fly in a PCPS environment in accordance with an embodiment of the present invention thus saves on table compute time and space. Using an embodiment that does not approximate core power states results in no artificial clipping due to approximations and ensures maximum performance gains. Also, using search heuristics and a binary search helps reduce the complexity to O(log(n)), which does not increase sleep state exit latencies.

Figure 6:
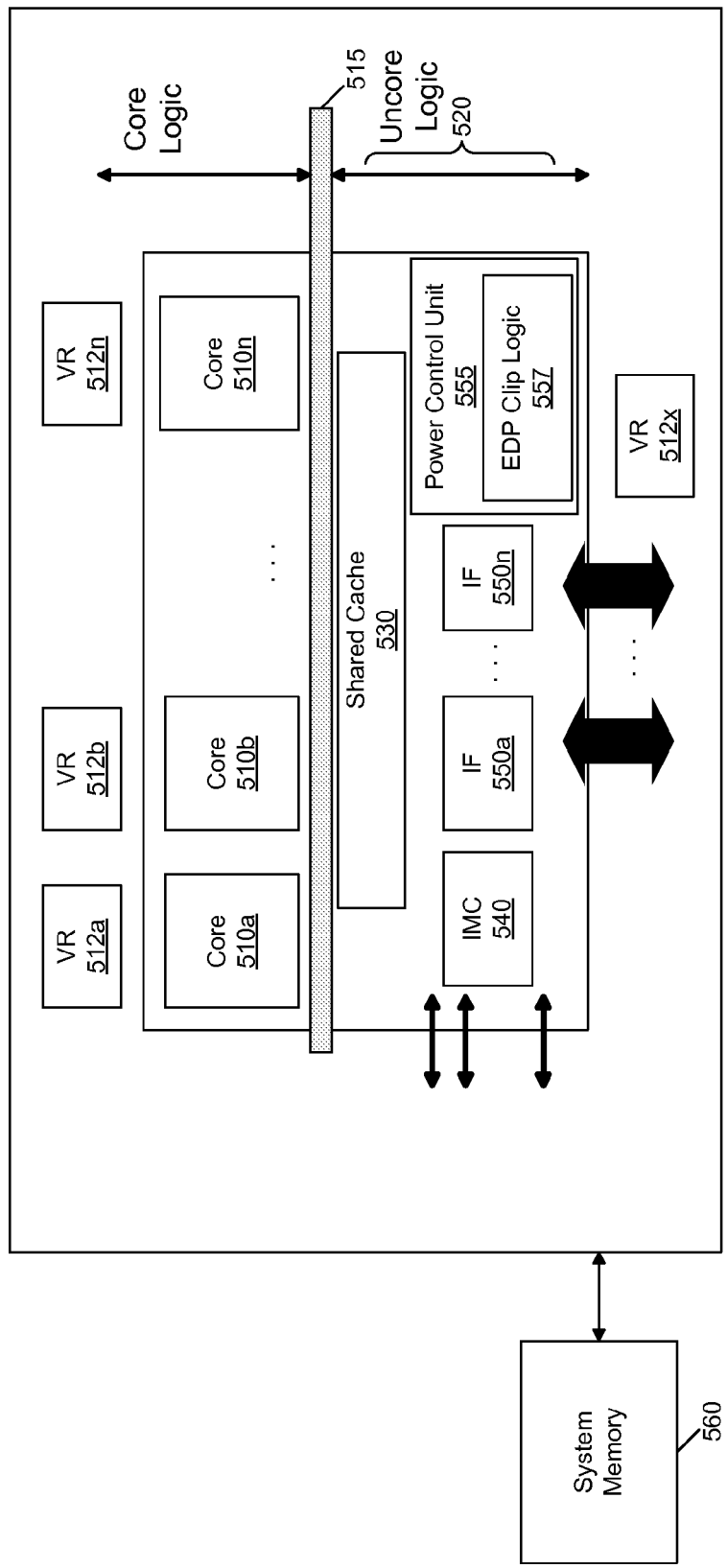
FIG. 6 is a block diagram of a processor in accordance with an embodiment of the present invention.

Referring now to FIG. 6, shown is a block diagram of a processor in accordance with an embodiment of the present invention. As shown in FIG. 6, processor 500 may be a multicore processor including a plurality of cores $510_a$-$510_n$. In one embodiment, each such core may be configured to operate at multiple voltages and/or frequencies. In addition, each core may be independently controlled to operate at a selected voltage and/or frequency, as discussed above. To this end, each core may be associated with a corresponding voltage regulator $512a$-$512n$. The various cores may be coupled via an interconnect 515 to an uncore or system agent logic 520 that includes various components. As seen, the uncore 520 may include a shared cache 530 which may be a last level cache. In addition, the uncore may include an integrated memory controller 540, various interfaces 550 and a power control unit 555.

In various embodiments, power control unit 555 may be in communication with OS power management code, effected by the OS writing to a machine specific register (MSR), one per logical processor. For example, based on a request received from the OS and information regarding the workloads being processed by the cores, power control unit 555 may use included EDP clip logic 557 that in one embodiment may execute firmware to realize the algorithm set forth in FIG. 3 and/or the pseudocode of Table 1. In this way EDP clip logic 557 can rapidly and dynamically determine a maximum permitted turbo mode frequency at which the cores can operate and stay within an EDP for a given temperature of the processor. Based on the above-described information, power control unit 555 can dynamically and independently control a frequency and/or voltage to one or more cores in light of the core's activity levels, and dynamically clip a core to a maximum permitted turbo mode frequency, which may be lower than a maximum available turbo mode frequency (and requested turbo mode frequency).

With further reference to FIG. 6, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 6, the scope of the present invention is not limited in this regard.

Figure 7:
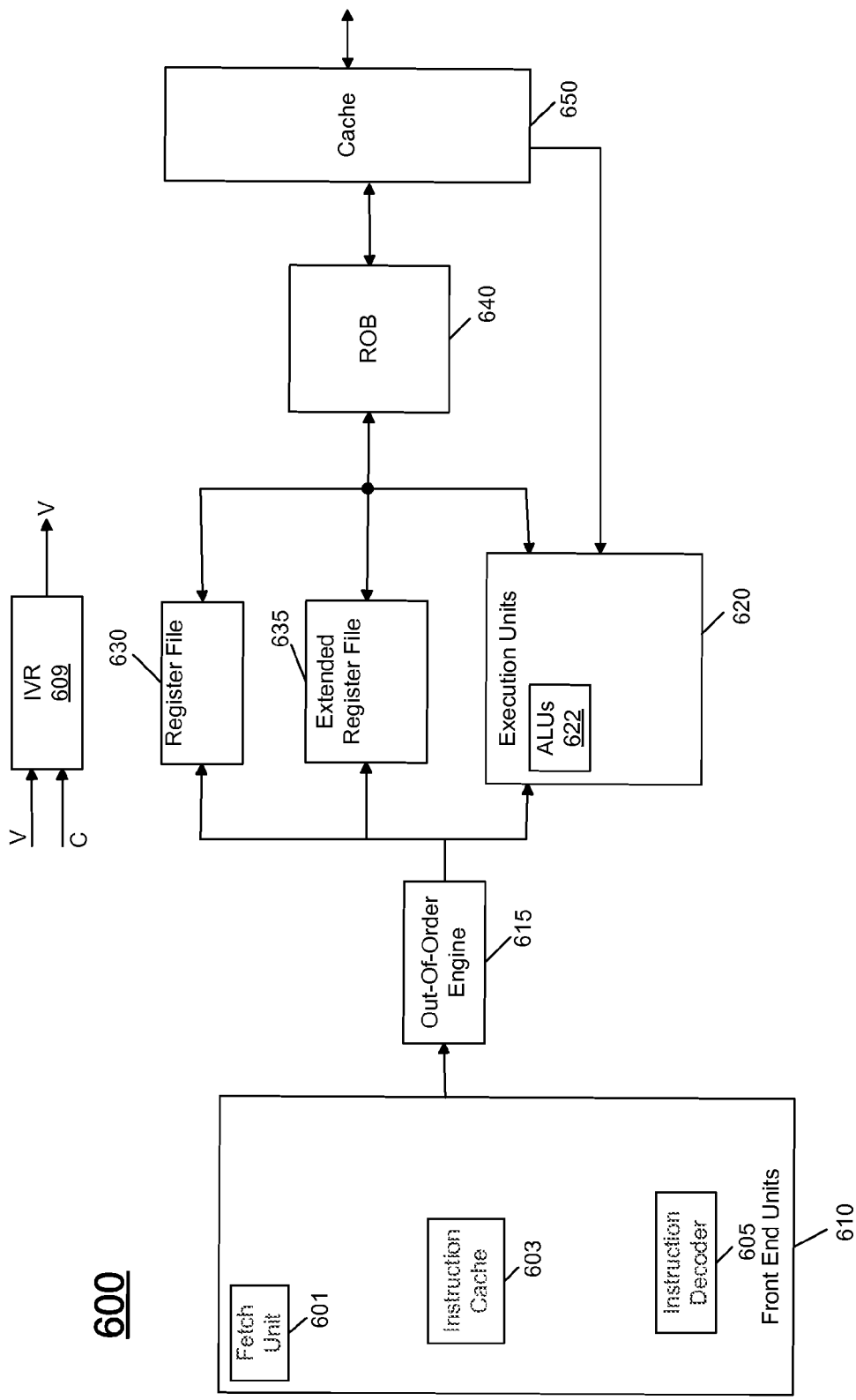
FIG. 7 is a block diagram of a processor in accordance with another embodiment of the present invention.

Referring now to FIG. 7, shown is a block diagram of a processor core in accordance with one embodiment of the present invention. As shown in FIG. 7, processor core 600 may be a multi-stage pipelined out-of-order processor. As shown in FIG. 7, core 600 may operate at various voltages and frequencies as a result of integrated voltage regulator 609. In various embodiments, this regulator may receive an incoming voltage signal, e.g., from an external voltage regulator and may further receive one or more control signals, e.g., from uncore logic coupled to core 600.

As seen in FIG. 7, core 600 includes front end units 610, which may be used to fetch instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units.

Results from the execution units may be provided to retirement logic, namely a reorder buffer (ROB) 640. More specifically, ROB 640 may include various arrays and logic to receive information associated with instructions that are executed. This information is then examined by ROB 640 to determine whether the instructions can be validly retired and result data committed to the architectural state of the processor, or whether one or more exceptions occurred that prevent a proper retirement of the instructions. Of course, ROB 640 may handle other operations associated with retirement.

As shown in FIG. 7, ROB 640 is coupled to a cache 650 which in one embodiment may be a low level cache (e.g., an L1 cache), although the scope of the present invention is not limited in this regard. Also, execution units 620 can be directly coupled to cache 650. From cache 650, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
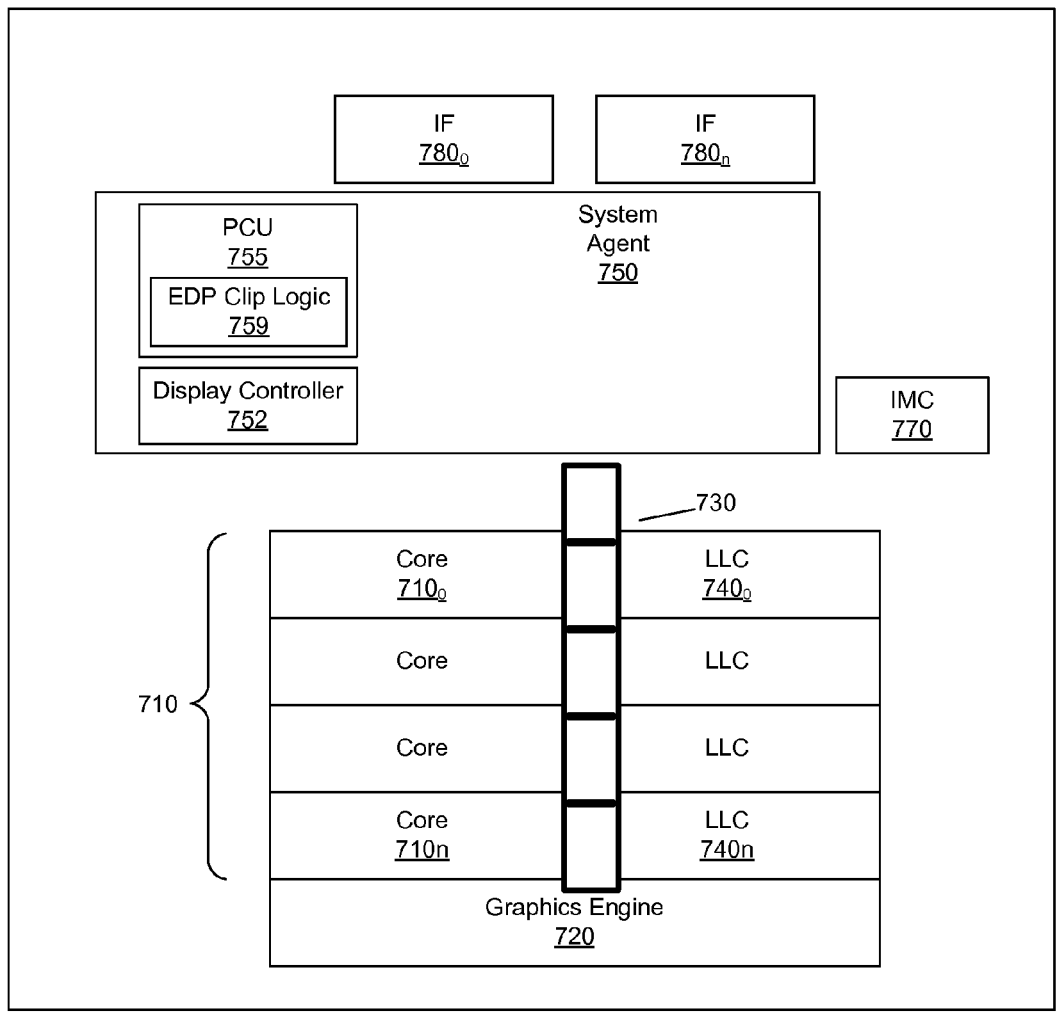
FIG. 8 is a block diagram of a multi-domain processor in accordance with another embodiment of the present invention.

Referring now to FIG. 8, shown is a block diagram of a multicore processor in accordance with another embodiment of the present invention. As shown in the embodiment of FIG. 8, processor 700 includes multiple domains. Specifically, a core domain 710 can include a plurality of cores $710_0$-$710_n$, a graphics domain 720 can include one or more graphics engines, and a system agent domain 750 may further be present. In various embodiments, system agent domain 750 may handle power control events and power management such that individual units of domains 710 and 720 such as cores and/or graphics engines can be controlled to independently dynamically operate at an appropriate turbo mode frequency in light of the activity (or inactivity) occurring in the given unit. Each of domains 710 and 720 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 710 may further include last level caches in addition to various execution units and additional processing elements. In turn, the various cores may be coupled to each other and to a shared cache memory formed of a plurality of units of a LLC $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755 which can include an EDP clip logic 759 in accordance with an embodiment of the present invention to dynamically limit a turbo mode frequency of the cores based on analysis of an available power budget, the activity status of cores seeking a turbo mode, and their determined contribution to power consumption. In various embodiments, this logic may execute the algorithm described above in FIG. 3 an/or the pseudocode of Table 1.

As further seen in FIG. 8, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 8, understand the scope of the present invention is not limited in this regard.

Figure 9:
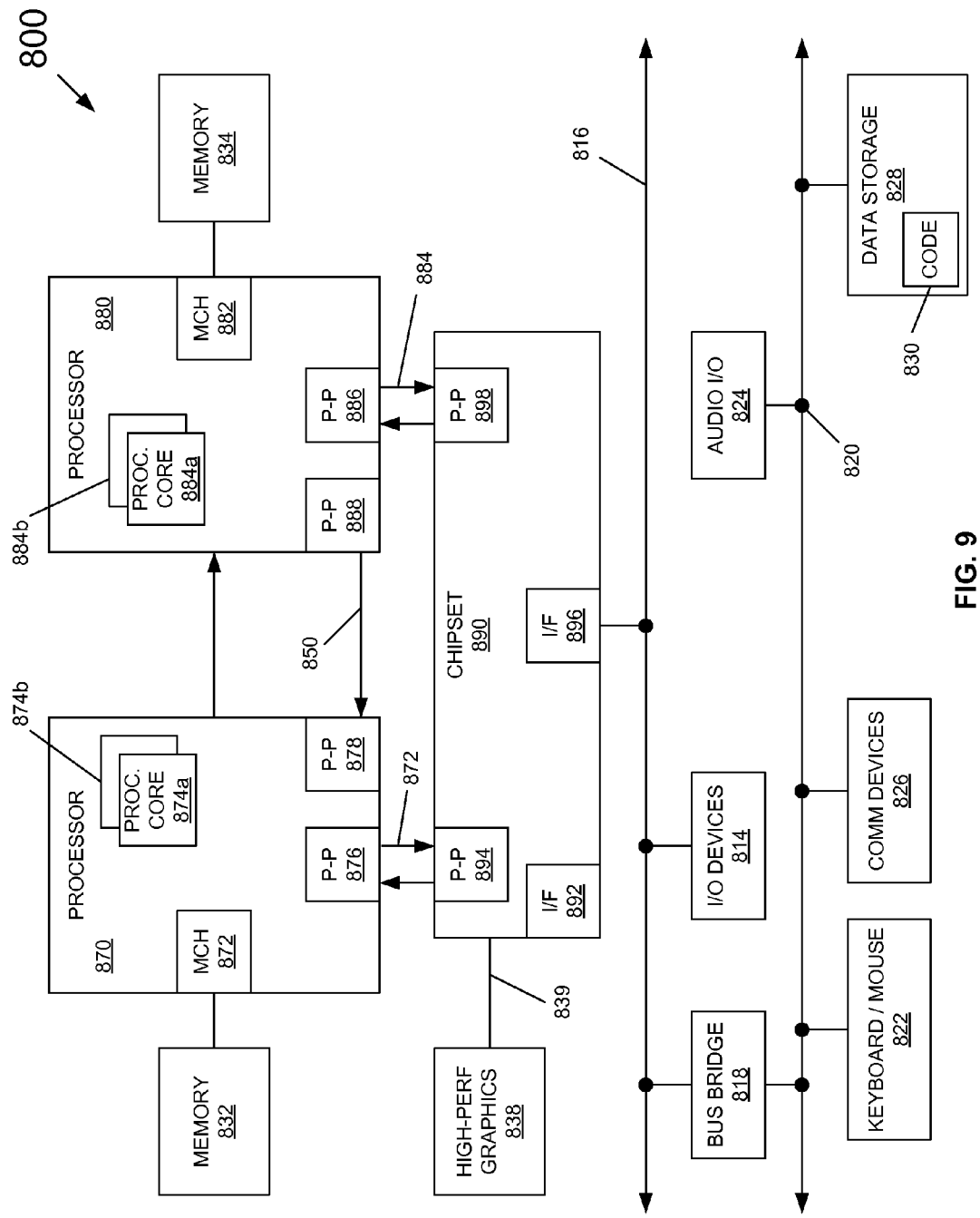
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 800 is a point-to-point interconnect system, and includes a first processor 870 and a second processor 880 coupled via a point-to-point interconnect 850. As shown in FIG. 9, each of processors 870 and 880 may be multicore processors, including first and second processor cores (i.e., processor cores 874a and 874b and processor cores 884a and 884b), although potentially many more cores may be present in the processors. Each of the processors can include a PCU or other logic to perform dynamic control of a maximum permitted operating frequency greater than a guaranteed operating frequency for cores seeking a higher than the guaranteed operating frequency, as described herein.

Still referring to FIG. 9, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 9, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 9, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 9, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, ultrabook, or so forth.

In accordance with the above discussion, an embodiment can be implemented as a processor with multiple cores each to independently execute instructions (and which may operate at an independent voltage and frequency). Included in the processor or coupled thereto may be a power controller. This controller can be configured with logic to group the cores into multiple groups corresponding to inactive cores, cores operating at or below a guaranteed maximum operating frequency, and cores requesting a turbo mode frequency. From these groupings, an available power budget for the turbo seeking cores can be determined based on power consumption for the other cores. Then an iterative search can be performed for a maximum permitted turbo mode frequency for these turbo seeking cores. In an embodiment, the power controller can be configured with one or more means for performing such operations.

Another aspect is directed to a system with a multicore processor including multiple cores and a PCU to dynamically limit a maximum permitted turbo mode frequency based on a core activity pattern that indicates for each of the cores an activity level and a logic unit state of the corresponding core and power consumption information of a unit power table that, in one embodiment, is dynamically computed based on a temperature of the multicore processor.

In another embodiment, control logic may be configured to execute a method that includes grouping cores into multiple groups, determining a power consumption for guaranteed and inactive cores to determine an available power budget for a turbo seeking group of cores, and performing an iterative search for a permitted maximum turbo mode frequency for this group of cores based on the available power budget. This iterative search can be performed until none of the this group of cores is requesting a turbo mode frequency greater than a candidate maximum permitted turbo mode frequency, a remaining power value is less than a threshold power level but not negative, or no further search is possible and the remaining power value is greater than zero.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores each to independently execute instructions, each of the plurality of cores to operate at an independent voltage and frequency; and
a power controller coupled to the plurality of cores and including first logic to group the plurality of cores into a first group of cores corresponding to inactive cores, a second group of cores corresponding to cores to operate at or below a guaranteed maximum operating frequency, and a third group of cores corresponding to cores to request a turbo mode frequency, determine a power consumption for the first and second groups of cores, determine an available power budget for the third group of cores based on the determined power consumption for the first and second groups of cores, and perform an iterative search for a maximum permitted turbo mode frequency for the third group of cores based at least in part on information in a unit power table including a plurality of entries, each entry to associate a turbo mode frequency with a first power consumption level at which a core is to operate when first circuitry of the core is to not execute and a second power consumption level at which the core is to operate when the first circuitry is to execute.

2. The processor of claim 1, wherein the first logic is to dynamically calculate the plurality of entries in the unit power table based on a temperature of the processor.

3. The processor of claim 2, wherein the first logic is to re-calculate the plurality of entries in the unit power table if the processor temperature changes by a threshold amount.

4. The processor of claim 1, wherein the first logic is to calculate a sum of power consumption for the third group of cores at a possible turbo mode frequency, and compare the sum to the available power budget.

5. The processor of claim 4, wherein the first logic is to reduce the possible turbo mode frequency to a lower turbo mode frequency if the sum is greater than the available power budget.

6. The processor of claim 4, wherein the first logic is to iteratively calculate the sum and perform the comparison until the possible turbo mode frequency is greater than a requested turbo mode frequency of any of the third group of cores.

7. The processor of claim 6, wherein the first logic is to terminate the iterative calculation and comparison when the sum is greater than or equal to zero and less than a minimum power threshold.

8. A system comprising:
a multicore processor including a plurality of cores each to independently execute instructions and to operate at an independent voltage and frequency, and a power control unit (PCU) to dynamically limit a maximum permitted turbo mode frequency of the plurality of cores based on a core activity pattern of the plurality of cores that indicates for each of the plurality of cores an activity level and a logic unit state of the corresponding core and power consumption information of a unit power table, wherein the PCU is to dynamically compute the power consumption information of the unit power table based on a temperature of the multicore processor, the unit power table including a plurality of entries, each entry to associate a turbo mode frequency with a first power consumption level at which a core is to operate when a first logic unit of the core is to not execute and a second power consumption level at which the core is to operate when the first logic unit is to execute.

9. The system of claim 8, wherein the PCU includes a power consumption calculator to dynamically compute the unit power table when a temperature of the multicore processor exceeds a threshold.

10. The system of claim 9, wherein the power consumption calculator is to calculate the first power consumption level and the second power consumption level for each of a plurality of turbo mode frequencies.

11. The system of claim 8, wherein the power control unit includes an electrical design point (EDP) clip logic to dynamically limit the maximum permitted turbo mode frequency based on the power consumption information of the unit power table by use of the core activity pattern stored in a core activity array, and a plurality of processor constraint values.

12. The system of claim 8, wherein the PCU further includes a core frequency controller to assign an operating frequency to at least one of the plurality of cores based on the maximum permitted turbo mode frequency.

13. A processor comprising:
a plurality of cores each to independently execute instructions, each of the plurality of cores to operate at an independent voltage and frequency; and
a power controller coupled to the plurality of cores and including a first logic to group the plurality of cores into a first group of cores corresponding to inactive cores, a second group of cores corresponding to cores to operate at or below a guaranteed maximum operating frequency, and a third group of cores corresponding to cores to request a turbo mode frequency and determine a power consumption for the first and second groups of cores, a second logic to determine an available power budget for the third group of cores based on the determined power consumption for the first and second groups of cores, and a third logic to search for a maximum permitted turbo mode frequency for the third group of cores, wherein the power controller includes a unit power table having a plurality of entries, each entry to associate a turbo mode frequency with a first power consumption level at which a core is to operate when first circuitry of the core is to not execute and a second power consumption level at which the core is to operate when the first circuitry is to execute.

14. The processor of claim 13, wherein the second logic is to dynamically calculate the plurality of entries in the unit power table based on a temperature of the processor.

15. The processor of claim 14, wherein the second logic is to re-calculate the plurality of entries in the unit power table if the processor temperature changes by a threshold amount.

16. The processor of claim 13, wherein the second logic is to calculate a sum of power consumption for the third group of cores at a possible turbo mode frequency, and compare the sum to the available power budget.

* * * * *